United States Patent [19]

Moore

[11] 4,427,719

[45] Jan. 24, 1984

[54] METHOD OF DEDUSTING METAL SULFATE GRANULES

[75] Inventor: William P. Moore, Hopewell, Va.

[73] Assignee: Frit Industries, Inc., Ozark, Ala.

[21] Appl. No.: 415,742

[22] Filed: Sep. 7, 1982

[51] Int. Cl.$^3$ .......................... B05D 1/36; B05D 7/00
[52] U.S. Cl. ..................................... 427/205; 427/184; 427/214; 427/221; 427/240; 427/242; 427/385.5; 427/399
[58] Field of Search ............ 427/221, 240, 214, 385.5, 427/184, 205, 399, 242

[56] References Cited

U.S. PATENT DOCUMENTS

| | | | |
|---|---|---|---|
| 3,278,325 | 10/1966 | Wissinger | 427/205 |
| 3,360,395 | 12/1967 | Blevenstein | 427/221 |
| 3,953,657 | 4/1976 | Yamaguchi et al. | 427/221 |
| 3,991,225 | 11/1976 | Blouin | 427/3 |
| 4,023,981 | 5/1977 | Perronin et al. | 427/221 |
| 4,304,588 | 12/1981 | Moore | 71/28 |

OTHER PUBLICATIONS

Tisdale and Nelson, *Soil Fertility and Fertilizers*, 2nd Edition, the Macmillan Company, New York, 1966, pp. 342, 391, 392, 395.

Meyer, *Urea-Formaldehyde Resins*, Addison-Wesley Publishing Company, Reading, Massachusetts, 1979, p. 207.

*Primary Examiner*—Norman Morgenstern
*Assistant Examiner*—Janyce A. Bell

[57] ABSTRACT

Method of dedusting granules of agricultural micronutrient metal sulfates by coating the granules with a monomeric liquid, which is catalytically polymerizable by the metal sulfates, and contacting the dust particles with the coated granules while the monomeric liquid is polymerized through an adhesive stage to a hard dry coating which occludes substantially all of the dust particles on the surface of the granules. Aqueous methylol and methylene ureas, partially condensed urea-formaldehyde solutions containing some free urea, and cane molasses are effective monomeric liquids for dedusting sulfates, oxysulfates, and mixtures of micronutrient metals, including: zinc, manganese, iron, copper, and lead. The dedusting method is effective in improving the condition of the granules when a small amount of conditioner such as clay is added as a dust. The conditioner occluded on the surface of the granule provides an effective base for coloring the granules with dye solutions.

19 Claims, No Drawings

METHOD OF DEDUSTING METAL SULFATE GRANULES

BACKGROUND OF THE INVENTION

1. Field of the Invention

This invention relates to the field of plant nutrients, particularly those metal compounds classified as micronutrients, and more particularly to a method for eliminating dusts from granules of metal sulfate micronutrients and from the processes producing and handling these granules.

2. Description of Prior Art

Micronutrients are used alone, or in combination with primary and secondary nutrients, as plant foods. They may be in the form of liquids, powders, or granules. Granules are desirable because they may be conveniently used in simple solids handling equipment, and the metal sulfate granules are particularly desirable because of their ease of production, relatively low cost, high water solubility, and ready availability for absorption into growing plants. The metals most commonly produced as sulfate micronutrient granules are: zinc, manganese, iron, and copper. The sulfates produced depend upon the type granulation process used and the amount of product solubility desired.

Granules of micronutrient sulfates are usually formed by blending sulfuric acid with finely divided metal oxides in a rotating drum to form a wide variety of granule sizes. The desired granule sizes, normally 6 to 16 U.S. Mesh, are recovered by screening, and the larger-sized granules are ground and recycled to the rotating drum as powder, along with the undersized particles. A tilted, rotating pan, or a fluidized bed apparatus, may be used instead of a rotating drum to form the metal sulfates.

To produce high purity metal sulfate granules, metals, or metal oxides are dissolved in sulfuric acid and water, where feasible, and any insoluble impurities are removed by filtration. Granules are produced by spraying the purified solution onto a bed of recycled metal sulfate solids and the resulting granules are dried by application of heat.

Dust is created in the metal sulfate processes: by physical attrition of the moving granules; by fine particles of raw material which, whether reacted to sulfates or not, do not agglomerate to granules; and by grinding recycled metal sulfate oversize granules. Dust may also be created by the addition of other dry powders to the granules. Dust may also be caused, in the absence of any chemical process, by physical abrasion which occurs in conveying, loading, unloading, or storing procedures.

Dusts on, and around, granules of micronutrient sulfates frequently cause the granules to stick together in lumps, to handle poorly, and to develop a poor condition during periods of storage which makes the granules difficult to handle and particularly troublesome to apply. Dusts of metal sulfate around micronutrient production, or handling, processes constitute an economic loss and, more importantly, may be hazardous to the workers in the area. Although lead is not considered a micronutrient metal, it is present in several sources of the micronutrient metals converted into sulfate granules, particularly zinc. Thus, it is important not only to recover all of the micronutrient metal sulfates present as dusts but also to remove all the lead dust which has an established toxicity level.

The micronutrient and fertilizer art shows that little work has been done to overcome the two problems of economic losses and health hazards from unrecovered dusts from micronutrient granules of metal sulfates. Some work has been reported on containing micronutrient metals as particles having high structural integrity. Tisdale and Nelson describe several such techniques in *Soil Fertility and Fertilizers*, The Macmillan Company, New York, 1966. On page 342, they state that zinc can be enveloped in frits. On page 395, they state that the addition of oil helps micronutrient powders to ahdere to fertilizer granules. On page 392, they describe developments which allow encapsulation of granular fertilizers to produce water impermeable coatings, giving a metered supply of nutrients and improving fertilizer condition. Various coating substances, such as plastics, resins, waxes, paraffins, elemental sulfur, and asphaltic compounds were cited as being under investigation.

Beat Meyer in Urea-Formaldehyde Resins, Addison-Wesley Publishing Company, 1979, Reading, Mass. told of the use of formaldehyde by Karnemaat to produce a dust-free N-P fertilizer. In U.S. Pat. No. 4,033,745 Moore disclosed a storable methylol-methylene solution which has the potential of polymerizing to water insoluble solids. In U.S. Pat. No. 3,991,225 Blouin discloses a method for sulfur coating fertilizer granules, particularly urea.

The art defines methods for coating fertilizers, for controlling nutrient release rates, for improving fertilizer condition, and for encapsulating granular fertilizers. The art also discloses several fertilizer coating materials. No mention was found in the art of a method for collecting and occluding dusts in a monomeric liquid, coated on the surface of metal sulfate granules, which metal sulfates catalyze the polymerization of the monomeric liquid through an adhesive stage to a hard film coating occluding and containing the dust particles. The art provides on method for improving the safety and increasing the recoveries in method sulfate granulation processes, nor does it provide operating parameters from which such a method might be resonably derived.

SUMMARY

I have now discovered a method of dedusting micronutrient metal sulfate granules and improving their recovery and condition by coating the granules with a monomeric liquid which is catalytically polymerized by the metal sulfate; contacting the dust particles with the granules while the monomeric liquid is catalytically polymerized through an adhesive stage where substantially all of the dust particles are occluded in the adhesive coating; and polymerizing further until the coating hardens to a film securely containing the dust particles on a well-conditioned granule.

I have found that methylol and methylene ureas, partially condensed aqueous urea-formaldehyde solutions containing some free urea, and molasses are effective monomeric liquids for use on, and polymerization by sulfates, and oxysulfates of zinc, manganese, iron, copper and lead. Operating parameters have been discovered which allow effective coating and dedusting without troublesome sticking or agglomeration of the granules. Dusts, or other finely divided particles may be added to the granules to improve granule condition or to form an improved base for coloring the granules so long as my dedusting method and its operating parameters are followed.

DESCRIPTION OF THE PREFERRED EMBODIMENTS

The method of dedusting granular agricultural micronutrient metal sulfates comprises four essential steps listed, as follows:

(1) substantially coating the micronutrient granules with a monomeric liquid, which is capable of being polymerized by the metal sulfates contained in and on the granules;

(2) catalytically polymerizing the monomeric liquid until it becomes adhesive;

(3) contacting contained or added dust with the coated granules until the dust particles substantially adhere to the coated granules;

(4) polymerizing the monomeric liquid further until the intermediate adhesive is converted to a dry coating, occluding and containing substantially all of the dust particles securely on the surface of the granules.

The monomeric liquids may be pure chemical compounds, mixtures of compounds, or aqueous solutions containing partially condensed low molecular weight polymers, which are initially low in viscosity and readily spreadable over the surface of the micronutrient granules. It has been discovered that a small group of monomeric liquids are catalytically polymerized by the micronutrient sulfates of zinc, manganese, iron, copper, and the impurity metal lead, through a brief adhesive stage to a hard coating on the surface of the granules. The sulfates found effective in the polymerization of this method comprise: sulfates, oxysulfates, and mixtures thereof. The mixture of extraneous materials such as metal oxides and clays with the metal sulfates does not interfere with their catalytic effectiveness so long as the metal sulfate is in substantial contact with the coating of monomeric liquid.

Monomeric liquids found to be effective in this method include methylol and methylene urea compounds containing 1 to 2 urea and formaldehyde moieties. Especially effective compounds include monomethylol urea, dimethylol urea, and methylene diurea. These compounds may be used as pure compounds, solid mixtures, and are most conveniently used as mixtures in aqueous solutions. Commercially available partially condensed urea-formaldehyde solutions have been found effective for the instant method so long as the solution has a viscosity between 10 and 40 centistokes at 25° C. Partially condensed U-F solutions with lower viscosities than 10 centistokes polymerized at too low a rate for commercial use, and resins with viscosities higher than 40 centistokes were found to coat the metal granules unevenly and ineffectively before they hardened. Although methylol and methylene compounds and mixtures, and solutions containing urea and formaldehyde in mol ratios lower than 1.5, form satisfactory coatings and films, they, undesirably, produce formaldehyde odors and vapors which are unpleasant and might be hazardous. They are therefore normally unusable. With urea/formaldehyde ratios higher than 2, the hardness of the final film on the granules is not sufficient to prevent poor granule storage condition and re-dusting. Thus, we have found that the urea-formaldehyde-based compounds, mixtures, solutions, or partially condensed solutions are effective with a urea-formaldehyde mol ratio range between 1.5 and 2.0. It has been found that some free urea in the urea-formaldehyde-based monomeric liquids improves the effectiveness of dust occlusion in the adhesive phase of the polymerization, and particularly free urea amounting to between 20 and 50 percent of the monomeric liquid. Free urea amounting to more than 50 percent undesirably decreases the hardness of the final coated granules.

Several types of molasses have also been found effective as monomeric liquids. They are polymerized more slowly by the metal sulfates than are the methylolmethylene urea, and the partially condensed urea-formaldehyde solutions, and are especially effective where the micronutrient granules must be handled for relatively long periods of time at elevated temperatures. Types of molasses which were found to be catalytically polymerized by the metal sulfates through an adhesive stage to a hard coating and which were effective in the instant method were wood sugar molasses, sugar beet molasses, and cane sugar molasses containing between 20 and 50 percent sugars. Cane sugar molasses was the optimum sugar source when diluted with water to a viscosity between 10 and 40 centistokes.

Although this invention is primarily directed to the elimination of metal sulfate dusts from micronutrient granules, I have discovered that this method is also effective for applying finely divided conditioning agents to the metal sulfate granules. Conditioning agents found to work most effectively include fine kaolin. Best results are obtained where 90 percent, and preferably 95 percent, of the particles are finer than 200 U.S. Mesh. It was found that the metal sulfate dusts stuck on the surface of the metal sulfate granules formed a base for applying liquid coloring solutions. The effectiveness of the coloring solution application was further improved by addition of finely divided clays, particularly fine Georgia Kaolin. An aqueous dye solution, such as 1 percent by weight of a 2 percent Dupont Paper Red Dye in water was found to effectively color the granules which were originally dark brown in color, a light red. The addition of 1.5 percent by weight of Georgia Kaolin fine enough to pass through a 200 U.S. Mesh Screen in my method changed the color of dark brown granules of metal sulfates to a very light gray color.

I have found that the oxysulfates, sulfates, and mixtures thereof are effective in the instant invention and that the selection of the sulfate depends largely upon the amount of sulfuric acid used in producing them from the metal raw material sources.

The dedusting of the micronutrient granules was found to provide for decreased handling losses, and increased micronutrient recoveries, in dusty micronutrient processes. To substantially increase the micronutrient recovery it was necessary to coat the micronutrient granules with between 0.5 and 2.5 percent by weight of a monomeric liquid. If less than 0.5 percent was used, dust losses were still significant, and if more than 2.5 percent was used, the granules became excessively sticky to the point of agglomeration and process inoperability. The monomeric liquid providing optimum dust and granule recovery contained between 40 and 75 percent monomethylol urea, between 2 and 8 percent methylenediurea, and between 20 and 35 percent free urea. Liquids containing more than 35 percent free urea did not form an additive phase rapidly enough to adhere the dust particles effectively and less than 20 percent free urea allowed the possibility of some free formaldehyde vapor forming. The presence of at least 2 percent methylenediurea was needed to initiate the formation of the adhesive, and more than 8 percent caused unsatisfactory storage stability in the monomeric liquid. Monomethylol urea concentrations between 40 and 75 percent provided a satisfactory combination of reactivity in formation of the adhesive and hard coating polymers, and raw material storage stability. It was desirable to dilute the monomeric liquid with water when the micronutrient process was operated at elevated temperatures. The dilution was done to allow for complete coating of the granules before the monomeric liquid polymerized to the adhesive and hard coatings.

To substantially increase recoveries it was necessary to maintain the temperature of the granules between 10° and 110° C., and preferably between 30° and 80° C. for 0.2 to 5.0 minutes, preferably between 1.0 and 2.0 minutes, to convert the monomeric liquid to an adhesive coating. Temperatures below 10° C. do not allow the monomeric liquid to polymerize to an adhesive, even in the presence of the metal sulfates, fast enough to prevent substantial losses of dust from the process. At temperatures above 110° C., the polymerization through the adhesive phase to a hard coating is so rapid that the dust particles do not have sufficient time to contact and stick to the adhesive. The handling conditions of the granules and monomeric liquid were found to be most satisfactory between 30° and 80° C. and overall process recoveries were highest in that temperature range.

Reaction times, in either batch or continuous processes, to make adhesive coatings on the granules were effective in the range between 0.2 and 5.0 minutes. Shorter reaction times gave adhesive coatings with insufficient tackiness for adhering the dust particles, and longer times made the coating too hard with insufficient sticking power to occlude and contain the dust particles. The adhesive coating worked best when the monomeric liquid was polymerized by the metal sulfates for between 1.0 and 2.0 minutes before adhering the dust particles.

The amount of dust particles mixed with, and onto, the metal sulfate granules coated with monomeric liquid polymerized to an adhesive stage, was optimally held between 1 and 4 times the weight of the monomeric liquid used. Amounts of dust less than 1 part produced a final product with a tendency to stick during storage and more than 4 parts of dust per part of monomeric liquid did not produce the desired complete complete recovery of product, and allowed some dust to escape. The temperature and retention times of the mixing of the dust with the adhesive coated metal sulfate granules required are about the coating and reaction times, although I have found that mixing times as long as 10 minutes may be used without excessive losses of dust.

After the dust is adhered to the metal sulfate granules, a further reaction time of at least one minute is required to allow the polymerization of the coating to continue until the coating is hard enough to securely hold the adhered and occluded dust and to develop a suitable condition. This further conditioning may be continued longer than one minute if the process arrangement requires it, but excessive continuation, say 20 minutes, for example, causes unwanted attrition of the granular product. Temperatures in the hardening stage are best contained between 10° and 110° C., and optimum results and product recoveries were obtained between 30° and 80° C.

It was found that product and process recoveries could also be increased using the above described batch procedures and conditions in a continuous flow rotating drum coater and in a continuous pan coater, which are widely used in the solid fertilizer industry.

I have found that the dedusting procedure may be used to coat micronutrient sulfate granules with other dusts introduced into the system for the purpose of improving the condition and appearance of the granules so long as the monomeric liquid selected is polymerizable by the metal sulfates, and the other requisite operating conditions are carefully maintained.

To obtain the most effective coating of the micronutrient metal granules, the granules must be sprayed with between 0.8 and 1.5 percent of the monomeric liquid while the granules are rolling in a rotating drum. The most effective spray liquid was found to contain between 40 and 75 percent monomethylol urea, between 2 and 8 percent methylenediurea, and between 20 and 35 percent free urea. This spray was most effective when diluted with between 1 and 3 parts by weight water.

To polymerize the monomeric liquid to form the most effective adhesive coating on the surface of the metal sulfate granules, it was necessary to maintain the coated granules at a temperature between 30° and 80° C. for a period of 1.0 to 2.0 minutes before applying the finely divided coating material. If these limits are not maintained, it was found that the coating dust either forms into separate granules containing only dust or is not occluded at all.

In the coating method it was necessary that the finely divided solid coating materials added to the adhesive-coated metal granules be very fine with at least 90 percent of the solids finer than 100 U.S. Mesh size, and preferably with at least 90 percent finer than 200 U.S. Mesh size. Larger particles were not effectively occluded on the adhesive surfaces.

To achieve a complete coating of the metal sulfate granules, at least 0.5 percent of the finely divided solids were required. The addition of more than 3.0 percent conditioning solids caused the final coated granular product to be dusty and in addition raw materials were wasted. The most effective coating, and conditioning resulting therefrom, was obtained by adding 1.0 to 2.0 percent of finely divided conditioning solids.

It was necessary to intimately mix the added conditioning solids with the sprayed metal sulfate granules for about 1.0 to 2.0 minutes to occlude the solids in the adhesive coating of the metal sulfate granules at a temperature between 30° and 80° C.

After the added solids were occluded in the adhesive surface of the granules, it was necessary to allow the coating to polymerize further for 1.0 to 2.0 minutes at 30° to 80° C. to a dry hard coating which contained substantially all of the finely divided conditioning solids added.

The most effective coating material found is kaolin, 90 percent of which is finer than 200 U.S. Mesh size. The most effective kaolin found which is commercially available is the type generally known as Georgia Kaolin. Other clays, such as china clays, could be effectively used to produce satisfactory granules of conditioned metal sulfates.

Dolomitic and calcitic limestones were used as conditioning materials so long as at least 90 percent of the limestone was finer than 200 U.S. Mesh. The limestone coatings were particularly effective when molasses was the monomeric liquid employed on the metal sulfate granules.

The granules of metal sulfate, after dedusting, may be effectively colored by spraying with an aqueous dye solution to produce attractive products, while it is virtually impossible to put enough aqueous dye on untreated granules to give them significant color. A wide variety of water soluble dyes may be used. Paper Red Dye manufactured by the Dupont Corporation is typical of these dyes.

Although the color acceptance of metal sulfate granules is improved by simple dedusting, the addition of a finely divided clay or kaolin substantially further improves the color acceptance of the granules. I have found that the most effective coloring is achieved by spraying kaolin coated metal sulfate granules with between 0.2 and 2.0 percent by weight of an aqueous solution, containing between 1 and 10 percent by weight of a water soluble dye.

EXAMPLE 1

A commercially granulated zinc oxysulfate product was selected for dedusting which contained primarily 6–16 U.S. Mesh particles, but emitted undesirable amounts of dust when it was handled. Screen analysis of this material showed that it contained 2.3 percent by weight of particles finer than 40 U.S. Mesh which could be considered dust.

A 629 gram sample of this dsty, granulated, zinc oxysulfate was added to a bench scale rotary drum, consisting of a 4-liter capacity stainless steel beaker containing no lifts or baffles. This bench scale drum was rotated at a speed of 120 r.p.m. at an angle of 15° from the horizontal, so that the granules rolled smoothly.

Monomethylol urea was diluted with water to produce an aqueous solution containing 29.5 percent monomethylol urea plus small amounts of its isomeric impurities.

While the dusty granular product was rolling in the test rotary drum at 100° C., the aqueous methylol urea amounting to 0.5 percent of the granule weight was applied to the surface of the zinc oxysulfate granules by means of a fine, continuous spray over a period of 2.0 minutes. The monomethylol solution coated the granules and polymerized to give an adhesive surface and the amount of free dust present decreased substantially after 30 seconds blending time, and was substantially eliminated after 90 seconds. The coated granules were rolled in the rotary beaker for an additional 2.0 minutes and then cooled to ambient temperature. Visual inspection showed that the granules contained no free dust. Screen analysis of the product granules indicated less than 0.1 percent of particles finer than 40 U.S. Mesh. Microscopic examination of the individual granules showed that a coating of hard polymer surrounded the granules and that the hard coating occluded and contained a heavy loading of fine dust particles.

EXAMPLE 2

A commercially granulated zinc sulfate monohydrate product containing primarily 8–14 U.S. Mesh particles was dusty to handle and screen analyses showed that it contained 2.0 percent by weight dusts finer than 40 U.S. Mesh.

Using the apparatus of Example 1, 650 grams of the dusty zinc sulfate granules were treated at 35° C. with 0.8 weight percent of methylenediurea dissolved as a 50 percent aqueous solution. The methylenediurea coated the granules and polymerized to an adhesive surface and the dust present was visibly and drastically reduced after 30 seconds contact time, and was substantially eliminated after 90 seconds. After an additional 2.0 minutes operation of the rotary drum the granules were cooled to ambient temperature and found to contain no loose dust. The individual zinc sulfate monohydrate granules were coated with hard polymer occluding and containing substantially all of the fine particles which were initially free dust.

EXAMPLE 3

A sample of commercially granulated iron oxysulfate product containing primarily 6–16 U.S. Mesh particles was dusty and screen analyses showed 1.9 percent by weight dusts finer than 40 U.S. Mesh. Analyses showed the iron to be 68 percent ferrous and 32 percent ferric.

Using the apparatus of Example 1, 700 grams of the dusty granules were treated at 35° C. with 2.0 percent of a commercial urea-formaldehyde solution containing 55 percent monomethylol urea, 3 percent methylenediurea, 25 percent free urea, and the remainder was primarily water where the overall urea to formaldehyde mol ratio was 1.65 and the solution viscosity was 30 centistokes at 25° C. The solution was added in a period of 2.0 minutes. The urea-formaldehyde solution coated the granules, forming adhesive surface and the free-dust was eliminated from the rotating drum after 2 minutes. After an additional 2 minutes in the rotating beaker, the granules were cooled to ambient temperature and found to contain the dust occluded in a hard polymer film.

EXAMPLE 4

A sample of commercially granulated manganese oxysulfate product containing primarily 6–16 U.S. Mesh particles was dusty and screen analysis showed 2.8 percent by weight dusts finer than '40 U.S. Mesh.

Using the apparatus of Example 1, 480 grams of the dusty granules were treated at 100° C. with cane molasses containing 60 percent sugar which was diluted with an equal weight of water. The molasses solution was introduced into the rotating granules over a period of 1.5 minutes forming an adhesive surface and the free dust was eliminated from the drum after 2.0 minutes. After an additional 2.0 minutes, the granules were cooled to ambient temperature and found to contain the dust occluded in a hard polymer coating.

EXAMPLE 5

A sample of commercially granulated mixed oxysulfates of iron, zinc, copper, and manganese containing primarily 6–16 U.S. Mesh particles was dusty and a screen analysis showed 3.9 percent by weight of dusts finer than 40 U.S. Mesh. Analysis of the dust showed that it contained 4.7 percent of lead which could be hazardous to people working around processes handling it.

Using the apparatus of Example 1, 650 grams of the dusty granules were treated at 45° C. with 2.0 percent of the commercial urea-formaldehyde solution used in Example 3. The solution was sprayed onto the rolling granules for a period of 2 minutes. The urea-formaldehyde monomeric liquid was catalytically polymerized by the metal sulfate surfaces to an adhesive coating on the granules and the free dust was eliminated from the rotating drum after 2 minutes. The granules were rolled for an additional 2 minutes and found to contain the dust particles occluded in a hard polymer film. Screening the final product showed that the lead-containing dust had been eliminated. The overall recovery of the granules including the dust was almost 100 percent, whereas recovery of the material without the dedusting would have been about 96.1 percent because of dust losses.

EXAMPLE 6

In a commercial micronutrient granulation plant, a mixture of zinc, copper, manganese, and iron oxides was granulated by reaction with aqueous sulfuric acid to produce primarily 6–16 U.S. Mesh granules of mixed micronutrient metal oxysulfates. Screen analyses showed that this granular product contained 2.6 percent by weight dusts finer than 40 U.S. Mesh. Analysis of the dust showed a lead content of 3.8 percent.

The dusty granules passed continuously from the rotary cooler of the granulation plant at 42° C. to a rotary Deduster-Coater, consisting of a horizontal steel drum 5 feet in diameter and 20 feet long, containing no lifts, but fitted with an 8-inch dam at the discharge end. As the horizontal steel drum rotated at 12 r.p.m. a rolling bed formed which covered about one-third of the periphery of the drum. The volume of granules retained in the Deduster-Coater, as they flowed continuously through, was about 40 cubic feet, or 2.25 tons of granular product. Angle of the drum from horizontal was just enough to prevent any backflow of material from the feed end.

Dusty granules were continuously fed to the Deduster-Coater at a rate of 22.0 tons per hour to produce a total retention time of 6 minutes. After the granules entered the Deduster-Coater, it was sprayed with 660 pounds (61.7 gallons) per hour of monomeric liquid which contained 50 percent monomethylol urea, 3 percent methylenediurea, 1 percent ammonia, 30 percent free urea and the remainder substantially water. The monomeric liquid was diluted with an equal weight of water prior to being sprayed onto the granules.

The monomeric liquid coated the metal sulfate granules and polymerized to form an adhesive surface on the granules as they flowed forward in the drum. About 4 feet into the rotating drum by means of a calibrated and continuously operating screw conveyor, kaolin was introduced at a rate of 1000 pounds per hour. The kaolin was produced by The Georgia Kaolin Company and contained 92 percent of particles finer than 200 U.S. Mesh.

The kaolin was rolled onto the adhesive coated granules so that by the time granules has passed 8 more feet into the Deduster-Coater, free dust had been substantially eliminated, and the dust was occluded and contained in the adhesive coating. Lead-containing dust was substantially eliminated. As the granules overflowed the dam at the discharge end of the rotary drum the adhesive coating had hardened and the granules had excellent handling and storage condition, and still contained the occluded dust and kaolin particles.

The color of the granules initially was a dusty brown. After addition of the monomeric liquid the color deepened to a dark chocolate, and at the discharge of the drum after the addition of the kaolin the color was a light gray color, which was almost white.

EXAMPLE 7

The system and materials of Example 6 were operated in the same manner, except that diatomaceous earth, china clay, and attapulgite clay were alternately substituted for the same amount of Georgia Kaolin. Light colored, coated granules were produced with each of the conditioning agents added. The diatomaceous earth and china clay coatings produced almost as good a handling and storing condition as did the kaolin, and the attapulgite clay was somewhat less effective. All coatings were darker in color than the kaolin coated granules.

EXAMPLE 8

The system and materials of Example 6 were operated in the same manner, except that 80 Brix cane sugar molasses was substituted for the methylol-methylene urea solution, and dolomitic limestone, 96 percent of which was finer than 200 U.S. Mesh, was substituted for the kaolin. The product granules were a light tan color, slightly darker than with the kaolin.

EXAMPLE 9

A solution of Dupont Paper Red Dye was made by dissolving 2 parts of the crystalline dye in 100 parts by weight of water, and this solution was sprayed continuously at a rate of 330 pounds per hour onto the rolling granule bed 4 feet from the end of the Deduster-Coater of Example 6. The system was otherwise operated at the rates and manner described in Example 6. The product granules discharged from the Deduster-Coater were bright pink in color and had excellent handling and storage condition.

I claim:

1. A method of eliminating dust, created by comminution in metal sulfate processes, from granules of agricultural micronutrient metal sulfates, comprising:
   (a) substantially coating micronutrient granules with a monomeric liquid, catalytically polymerizable by said metal sulfates;
   (b) polymerizing catalytically said monomeric liquid until it forms an adhesive;
   (c) contacting dust with coated granules until dust particles substantially adher to adhesive coated granules;
   (d) polymerizing further until said adhesive is converted to a dry coating occluding substantially all dust particles on the granules.

2. The method in accordance with claim 1 wherein said monomeric liquid is a methylol urea compound containing 1 to 2 urea and formaldehyde moieties.

3. The method in accordance with claim 1 wherein said monomeric liquid is a methylene urea compound containing 1 to 2 urea and formaldehyde moieties.

4. The method in accordance with claim 1 wherein said monomeric liquid is an aqueous solution comprising methylol and methylene ureas containing 1 to 2 urea and formaldehyde moieties.

5. The method in accordance with claim 1 wherein said monomeric liquid is a partially condensed urea-formaldehyde solution having a urea/formaldehyde mol ratio between 1.5 and 2.0, and a viscosity between 10 and 40 centistokes at 25° C.

6. The method in accordance with claim 5 wherein said urea-formaldehyde solution contains 20 to 50 percent by weight free urea.

7. The method in accordance with claim 1 wherein the monomeric liquid is a molasses selected from the group consisting of cane sugar molasses, sugar beet molasses, and wood sugar molasses.

8. The method in accordance with claim 1 wherein the metals of the agricultural micronutrient metal sulfates are selected from the group consisting of zinc, manganese, iron, copper, lead, and mixtures thereof.

9. The method in accordance with claim 1 wherein the sulfates of the agricultural micronutrient metal sulfates are selected from the group consisting of sulfates, oxysulfates and mixtures thereof.

10. The method in accordance with claim 1 wherein the dust particles are conditioning agents for the granules.

11. A method of increasing recovery of product in dusty micronutrient sulfate granulation processes, comprising:
   (a) coating micronutrient granules with between 0.5 and 2.5 percent by weight of a monomeric liquid containing between 40 and 75 percent by weight monomethylol urea, between 2 and 8 percent methylenediurea, and between 20 and 35 percent free urea, said monomeric liquid being diluted with between 1 and 10 parts by weight of water;
   (b) polymerizing said monomeric liquid on metal sulfate granules at a temperature between 10° and 110° C., for 0.2 to 5.0 minutes, minutes to produce an adhesive granule coating;
   (c) contacting dust particles, amounting to between 1 and 4 parts by weight of the monomeric liquid, with the coated granules at a temperature between 10° and 110° C., for 0.2 to 10.0 minutes,
   (d) polymerizing said adhesive coating further at temperatures between 10° and 110° C., for a period of more than 1.0 minute to produce a dry coating occluding substantially all dust particles on recoverable granules.

12. The method in accordance with claim 11 wherein the micronutrient sulfate granulation process is performed on a continuous flow basis in a rotating drum.

13. The method in accordance with claim 11 wherein the micronutrient sulfate granulation process is performed on a continuous flow basis in a pan coater.

14. A method of coating micronutrient metal sulfate granules, comprising:
   (a) spraying said granules, while they are rolling in a rotating drum, with between 0.8 and 1.5 percent by weight of a monomeric liquid containing between 40 and 75 percent monomethylol urea, between 2 and 8 percent methylenediurea, and between 20 and 35 percent free urea, said monomeric liquid being diluted with between 1 and 3 parts by weight of water;
   (b) polymerizing said monomeric liquid on metal sulfate granules at a temperature between 30° and 80° C. for 0.5 to 1.5 minutes to produce an adhesive granule coating;
   (c) adding finely divided coating material containing at least 90 percent minus 100 U.S. Mesh size particles, said coating material amounting to between 0.5 and 3.0 percent by weight of the granules;
   (d) contacting the added coating material with the sprayed metal sulfate granules for 1.0 to 2.0 minutes at temperatures between 30° and 80° C.;
   (e) polymerizing the adhesive granule coating further at temperatures between 30° and 80° C. for a period of more than 1.0 minute to produce a dry coating occluding and containing substantially all of the finely divided coating solids added.

15. A method in accordance with claim 14 wherein the finely divided coating material is kaolin, 95 percent of which is finer than 200 U.S. Mesh.

16. A method in accordance with claim 14 wherein the finely divided coating material is china clay, 95 percent of which is finer than 200 U.S. Mesh.

17. A method in accordance with claim 14 wherein the monomeric liquid sprayed on the granules is cane sugar molasses containing between 20 and 50 weight percent sugar.

18. A method in accordance with claim 17 wherein the finely divided coating material is dolomitic or calcitic limestone, 95 percent of which is finer than 200 U.S. Mesh.

19. A method for coloring granules of agricultural micronutrient metal sulfates, comprising:
   (a) spraying said granules, while they are tumbling in a rotating drum, with between 1 and 3 percent by weight of a monomeric liquid containing between 40 and 75 percent monomethylol urea, between 2 and 8 percent methylenediurea, and between 20 and 35 percent free urea, said monomeric liquid being diluted with between 1 and 3 parts by weight of water;
   (b) polymerizing said monomeric liquid at a temperature between 30° and 80° C. for 1.0 to 2.0 minutes to produce an adhesive granule coating;
   (c) adding between 1 and 4 percent by weight of kaolin, 95 percent of which is finer than 200 U.S. Mesh;
   (d) mixing the added kaolin with the sprayed metal sulfate granules for 1.0 to 2.0 minutes at temperatures between 30° and 80° C.;
   (e) polymerizing the adhesive granule coating further at temperatures between 30° and 80° C. for a period of time between 1 and 4 minutes to produce a dry coating occluding and containing the kaolin;
   (f) spraying the kaolin-coated granules with between 0.2 and 2.0 percent by weight of an aqueous solution of concentrated dye containing between 1 and 10 percent of a water soluble dye.

* * * * *